United States Patent
Jeng et al.

(10) Patent No.: US 11,205,150 B2
(45) Date of Patent: Dec. 21, 2021

(54) APPARATUS AND METHOD FOR POLICY-DRIVEN BUSINESS PROCESS EXCEPTION HANDLING

(75) Inventors: Jun-Jang Jeng, Armonk, NY (US); Hui Lei, Scarsdale, NY (US); Liangzhao Zeng, Ossining, NY (US); Hung-yang Chang, Scarsdale, NY (US); Santhosh Kumaran, Croton on Hudson, NY (US); Jen-Yao Chung, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1791 days.

(21) Appl. No.: 12/061,089

(22) Filed: Apr. 2, 2008

(65) Prior Publication Data

US 2008/0189534 A1 Aug. 7, 2008

Related U.S. Application Data

(63) Continuation of application No. 10/853,503, filed on May 26, 2004, now abandoned.

(51) Int. Cl.
*G06Q 10/06* (2012.01)
*G06Q 10/10* (2012.01)

(52) U.S. Cl.
CPC ..... *G06Q 10/067* (2013.01); *G06Q 10/06375* (2013.01); *G06Q 10/06395* (2013.01); *G06Q 10/10* (2013.01)

(58) Field of Classification Search
CPC ............. G06Q 10/10; G06Q 10/06395; G06Q 10/067; G06Q 10/06375
See application file for complete search history.

(56) References Cited

U.S. PATENT DOCUMENTS 5,485,620 A * 1/1996 Sadre ............... G05B 19/41865
700/18
5,845,067 A * 12/1998 Porter ..................... G06F 17/22
707/999.009

(Continued)

FOREIGN PATENT DOCUMENTS

JP 06318739 A * 11/1994
WO WO0146884 A2 * 6/2001

(Continued)

OTHER PUBLICATIONS

IP.IQ.com search. (Year: 2021).*

(Continued)

*Primary Examiner* — Tan D Nguyen
(74) *Attorney, Agent, or Firm* — Daniel Morris; Otterstedt, Wallace & Kammer, LLP

(57) ABSTRACT

A model-driven and QoS-aware infrastructure facilitates the scalable composition of Web services in highly dynamic environments. An exception management framework supports two modes of exception management for business processes, providing a novel policy-driven approach to exception management implemented in the system infrastructure. Exception management is implemented in the system infrastructure, with exception handling policies supplied by individual business processes. Using the exception management framework, developers define exception policies in a declarative manner. Before a business process is executed, the service composition middleware integrates the exception policies with normal business logic to generate a complete process schema. This policy driven-approach can significantly reduce the development time of business processes through its separation of the development of the business logic and the exception handling policies.

19 Claims, 9 Drawing Sheets

(56) References Cited

U.S. PATENT DOCUMENTS

| | | | |
|---|---|---|---|
| 6,256,773 B1* | 7/2001 | Bowman-Amuah | G06F 8/71 707/999.202 |
| 6,434,628 B1* | 8/2002 | Bowman-Amuah | H04L 29/06 714/1 |
| 6,640,249 B1* | 10/2003 | Bowman-Amuah | 709/228 |
| 6,853,974 B1* | 2/2005 | Akifuji | G06Q 10/06316 705/7.26 |
| 6,895,382 B1* | 5/2005 | Srinivasan | G06Q 10/063118 705/7.17 |
| 6,918,053 B1 | 7/2005 | Thatte et al. | |
| 2002/0029207 A1* | 3/2002 | Bakalash | G06F 16/30 |
| 2002/0107830 A1* | 8/2002 | Nanja | G06F 17/30905 |
| 2002/0188486 A1* | 12/2002 | Gil et al. | 705/7 |
| 2003/0069973 A1* | 4/2003 | Ganesan | H04L 29/06 709/226 |
| 2003/0090514 A1* | 5/2003 | Cole | G06Q 10/10 715/744 |
| 2003/0149599 A1* | 8/2003 | Goodall | G06Q 50/22 705/2 |
| 2003/0154472 A1* | 8/2003 | Daase | G06F 8/61 717/176 |
| 2003/0191679 A1* | 10/2003 | Casati | G06Q 10/109 705/7.12 |
| 2003/0233631 A1* | 12/2003 | Curry et al. | 717/100 |
| 2004/0230447 A1* | 11/2004 | Schwerin-Wenzel | G06Q 10/10 705/300 |
| 2005/0267765 A1* | 12/2005 | Jeng | G06Q 10/06395 705/7.41 |
| 2006/0143611 A1* | 6/2006 | Sadiq | G06Q 10/06 718/100 |
| 2008/0065397 A1* | 3/2008 | Huang | G06Q 10/06395 705/7.41 |
| 2008/0119201 A1* | 5/2008 | Kolber | H04L 67/306 455/456.1 |
| 2008/0127044 A1* | 5/2008 | Barros | G06Q 10/06 717/104 |
| 2013/0290239 A1* | 10/2013 | Vaquero | G06N 5/025 706/47 |

FOREIGN PATENT DOCUMENTS

| | | | | |
|---|---|---|---|---|
| WO | WO-0194958 A2 | * | 12/2001 | G01R 31/3193 |
| WO | WO 02/099667 | * | 12/2002 | G06F 15/00 |

OTHER PUBLICATIONS

Google Scholar search. (Year: 2021).*

Zeng, Liangzhao, "Policy-Driven Exception-Management For Composite Web Services", Jan. 1, 2005, 7th IEEE International Conference on E-Commerce Technology (CEC'05), pp. 355-363, see Abstract/Summary. (Year: 2005).*

Bruccoleri, M., "Distributed Intelligent Control of Exceptions in Reconfigurable Manufacturing Systems", May 10, 2003, International Journal of Production Research, 41:7: 1393-1412, see Abstract (Summary). (Year: 2003).*

Francisco Curbera, "Exception Handling in the BPEL4WS Language", 2003, IBM Watson Research Center, BPM 2003, LNCS 2678, pp. 276-290. (Year: 2003).*

Claus Hagen, "Flexible Exception Handling in the OPERA Process Support System", Information and Communication Systems Research Group, 1998, pp. 526-533. (Year: 1998).*

Chris Peltz, "Web Services Orchestration and Choreography", 2003, IEEE Computer Society, pp. 46-52. (Year: 2003).*

L. Zeng, et al.: Quality Driven Web Services Corporation.

P. Greenfield, et al.; Compensation is Not Enough; CSIRO Mathematical and Information Sciences, School of Information Technologies, University of Sydney; pp. 1-8.

S. Chakravarthy, et al.;Composite Events for Active Databases: Semantics, Contexts and Detection; Database Systems Research and Development Center Computer and Information Sciences Department, University of Florida, pp. 606-617.

C. Peltz, Web Services Orchestration: A Review of Emerging Technologies, Tools. and Standards; 2002-2003 Hewlett Packard, Co. Jan. 2003; pp. 1-20.

L. Zeng, et al.; Quality Driven Web Services Corporation, May 2003; pp. 1-10.

S. Chakravarthy, et al.' Composite Events for Active Databases: Semantics, Contexts and Detection; Databases Systems Research and Development Center Computer and Information Sciences Department, University of Florida pp. 606-617; 1994.

* cited by examiner

```
inst oblig policyName "{"
on event-specification;
subject [<type>]domain-Scope-Expression;
[target [<type>]domain-Scope-Expression;]
do exception-management-action-list;
[when constraint-Expression ;]
"}"
```

*Figure 2*

```
inst oblig Timeout {
on $delayDuration >= 120 sec;
subject SecurityInvestment;
target ∀t ∈ {RiskAnalysis, SecuritySelection};
do timeout(t);
}
```

*Figure 3*

```
inst oblig Retry {
on E(timeout,t) ∨ E(failure,t);
subject SecurityInvestment;
target ∀t ∈ {FutureExchange, StockExchange };
do retry(t,2, alternative);
}
```

*Figure 4*

```
inst oblig Multiple Recovery {
subject SecurityInvestment;
target ∀t ∈ {SecuritySearching};
do multiple(t,3);
}
```

*Figure 5*

```
inst oblig Replacement Recovery {
on (E(timeout,t) ∨ E(failure,t)) ∧ ($retryTimes>=
    $retryUpperBound) ;
subject SecurityInvestment;
target ∀t ∈ {OnlineStockExchange};
do replace(OnlineStockExchange, ManualStockExchange);
}
```

*Figure 6*

```
inst oblig Skip Policy {
on E((timeout,t) V E(failure,t)) ∧ ($retryTimes>=
    $retryUpperBound) ;
subject SecurityInvestment;
target ∀t ∈ {LowPriceBid};
do skip(t);
}
```

*Figure 7*

```
inst oblig Rollback {
on (E(timeout,t) V E(failure,t)) ∧
    ($retryTimes>=$retryUpperBound) ;
subject SecurityInvestment;
target ∀t ∈ {FutureExchange,SecuritySearching};
do rollback(BudgetAnalysis);
}
```

*Figure 8*

FutureExchange

APPARATUS AND METHOD FOR POLICY-DRIVEN BUSINESS PROCESS EXCEPTION HANDLING

CROSS-REFERENCE TO RELATED APPLICATION

This application is a continuation of U.S. patent application Ser. No. 10/853,503 filed May 26, 2004.

BACKGROUND OF THE INVENTION

Field of the Invention

The present invention generally relates to a model-driven and QoS-aware infrastructure for facilitating the scalable composition of Web services in highly dynamic environments and, more particularly, to an exception management framework which supports two modes of exception management for business processes, providing a novel policy-driven approach to exception management implemented in the system infrastructure.

Background Description

Process-based composition of Web services has recently gained significant momentum in the implementation of business processes. A critical and time-consuming part of modeling any business process is the detection and handling of exceptions that may occur during process execution. The Web services paradigm promises to take across-network application interactions one step further by enabling programmatic access to applications over the Web. Recently, process-based composition of Web services has emerged as the technology of choice for integrating heterogeneous and loosely coupled applications (see Boualem Benatallah and Fabio Casati, editors, *Distributed and Parallel Database, Special Issue on Web Services*, Springer-verlag, 2002). As such, process-based integration of services has been the subject of intense research and standardization efforts. This approach provides an attractive alternative to hand-coding the interactions between applications using general-purpose programming languages. An example of a business process would be a "Security Investment" system that aggregates multiple component services for security selection, budget analysis, market analysis, share exchange and future exchange, which are executed sequentially or concurrently.

Modeling business processes would be easier if all the activities could be completed successfully without any occurrence of exceptions (see Paul Greenfield et al., "Compensation is not enough", *7th IEEE International Enterprise Distributed Object Computing Conference*, September 2003). Unfortunately experiences show (see Chris Peltz, "Web Services Orchestration: a review of emerging technologies, tools and standards", Technical Report, Hewlett-Packard Company, 2003) that a large amount of effort in the development of a business process is spent on exception management. In particular, Web services may operate in a highly dynamic environment, e.g., new services may become available at any time, existing services may become obsolete or temporarily unavailable, and services may offer different QoS (Quality of Service) properties or withdraw of advertised QoS properties. Such highly dynamic environment increases the probability of deviation situations during the execution of a business process and an increased complexity in exception handling logic. Therefore, it is important to provide support for exception management in the infrastructure so that developers can focus on defining the business logic, or normal flow, of a business process and delegate exception handling to the system infrastructure.

SUMMARY OF THE INVENTION

It is therefore an object of the present invention to provide a novel policy-driven approach to exception management, which can substantially simplify the development of business processes.

According to the invention, exception management is implemented in the system infrastructure, with exception handling policies supplied by individual business processes. Using the exception management framework, developers define exception policies in a declarative manner. Before a business process is executed, the service composition middleware integrates the exception policies with normal business logic to generate a complete process schema. Our initial experiments show that our policy driven-approach can significantly reduce the development time of business processes through its separation of the development of the business logic and the exception handling policies.

The novel policy-driven exception-management framework for business processes according to the invention is characterized by the following:

In our framework, the development of business processes is substantially simplified by separating the development of the business logic and the exception handling policies.

In order to capture the exception management knowledge, we identify a set of exception handling policy templates or patterns for declaratively defining deviation situations and associated exception handlers. At run time, the service composition middleware dynamically integrates the exception handling policies with the business logic to generate complete process schemas that specify both the normal and exceptional behaviors of the business processes.

The framework supports two modes of exception management in business processes, namely, centralized and distributed. In the centralized mode, since a generated process schema contains all the necessary exception handlers, the exception management can be supported using the exception handling capabilities of the underlying process execution engine. In the distributed mode, our exception management framework dynamically binds exception policies with a specific execution plan (i.e., a business process instance) at runtime to generate control tuples. When these control tuples are deployed to component services, they enable local exception detecting and handling which is able to react to an exception faster than the centralized approach.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a listing of the exception handling policy syntax;

FIG. 3 is a listing of the timeout policy;

FIG. 4 is a listing of the retry policy;

FIG. 5 is a listing of the multiple binding policy;

FIG. 6 is a listing of the replacement policy;

FIG. 7 is a listing of the skip policy;

FIG. 8 is a listing of the rollback policy;

DETAILED DESCRIPTION OF A PREFERRED EMBODIMENT OF THE INVENTION

Figure 1:
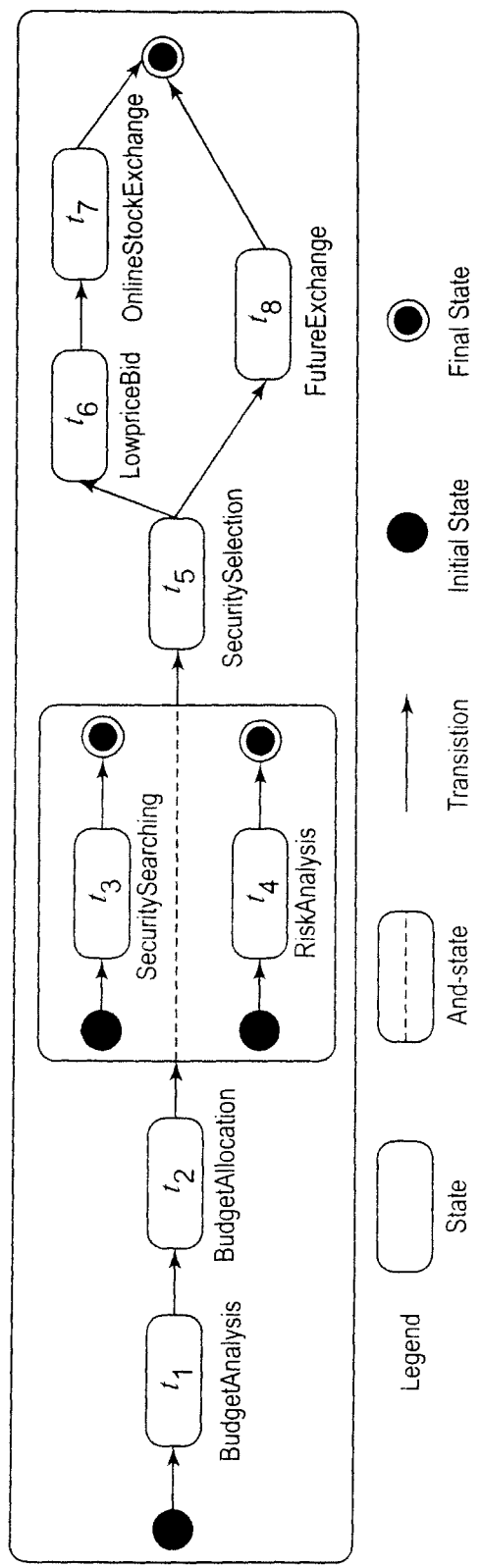
FIG. 1 is a statechart of a business process "security investment"

We begin by briefly describing the main concepts of the service composition model we use in this disclosure. A composite Web service is an aggregation of multiple other elementary and composite Web services, which interact with each other according to a process model. We choose to specify the process model of a business process as a statechart which is a platform independent modeling tool, as shown in FIG. 1. The choice of statecharts for specifying business process is motivated by two main reasons: (i) statecharts have a well-defined semantics; and (ii) they offer the basic flow constructs found in contemporary process modelling languages (i.e., sequence, conditional branching, structured loops, concurrent threads, and inter-thread synchronization). It should be noted that exception management techniques developed in the context of statecharts, can be adapted to other process modeling languages (e.g., BPEL4WS, WSCI, BPML).

A basic state of a statechart describing a business process can be labelled with an invocation to either of the following:

An elementary Web service, i.e., a service which does not transparently rely on other Web services.

A business process aggregating several other services.

A Web service community, i.e., a collection of Web services with a common functionality although different non-functional properties (e.g., with different providers, different QoS parameters, reputation, etc.)

Web services in a community share a common service ontology. Service communities provide descriptions of a desired functionality (e.g., flight booking) without referring to any actual service (e.g., Qantas flight booking Web service). The set of members of a community can be fixed when the community is created, or it can be determined through a registration mechanism, thereby allowing service providers to join, quit, and reinstate the community at any time.

In general, by selecting a candidate service (see Liangzhao Zeng et al., "Quality Driven Web Services Composition", *Proceedings of the 12$^{th}$ International Conference on World Wide Web (WWW)*, Budapest, Hungary, ACM Press, May 2003) (see Definition 1) for each task in the business process, an execution plan (see Definition 2) can be generated to create execution instance of business processes.

Definition 1 (Candidate services) Let us assume that $T=\{t_1, t_2, \ldots, t_n\}$ represents the set of all tasks in the business process CS. Function $S(t_i)$ gives a set of candidate services that can be used to execute task $t_i$, where $$S(t_i) = \{s_{1i}, s_{2i}, \ldots, s_{mi}\} \quad (1)$$

Definition 2 (Execution plan). A set of pairs $p=\{<t_1, s_1>, <t_2, s_2>, \ldots, <t_n, s_n>\}$ is an execution plan of a business process if:

$\{t_1, t_2, \ldots, t_b\}$ is the set of tasks in the business process.

For each 2-tuple $<t_i, s_i>$ in p, the service si is assigned the execution of task $t_i$.

Exception Handling Policies

The syntax of an exception handling policy is shown in FIG. 2. In this syntax, every word in bold is a token in the language and optional elements are specified with square brackets. Note the required exception event specification following the on keyword. The event can be a primitive event or a compound event which is composed from primitive events using event combination operators (see Sharma Chakravarthy et al., "Composite events for active databases: Semantics, contexts and detection", Proceedings of 20$^{th}$ International Conference on Very Large Data Bases, September 12-15,1994, Santiago de Chile, Chile, pp. 606-617, Morgan Kaufmann, 1994.

A primitive event can be an execution exception (e.g., E (failure)) or a QoS exception event. The term subject refers to either composite, communities or component services. The target object indicates the scope of the exception handling policy, or the entire business process. The do-clause specifies exception management actions that include primitive and compound actions. See table 1 for examples. We distinguish between six types of exception handling policies, namely: timeout, retry, multiple binding, replacement, skip and rollback policies. It should be noted that the types of policy in our framework is extensible: new types of policies can be added without fundamentally altering the exception handling techniques built on top of the framework.

TABLE 1

Exception Handling Action

| Action | Brief Explanation |
|---|---|
| timeout ( ) | Timouts a task execution |
| retry ( ) | Retries task execution by same services or different services |
| multiple ( ) | Invokes multiple services at the same time and returns the results of the service that completes execution first. |
| replace ( ) | Replaces the execution of a task (resp., segment) with other task (resp., segment) |
| skip ( ) | Skips the execution of tasks or a segment |
| rollback ( ) | Rollbacks the task execution to a task and then resumes the task execution |

Timeout Policy. A timeout policy specifies the condition when service execution should be timeout. For example, in FIG. 3, the timeout policy is associated with the tasks RiskAnalysis and SecuritySelection. In this policy, if the completion of the execution of the task is delayed more than 120 seconds, then the execution will be timeout.

Retry Policy. A retry policy specifies how many times the service binding in sequence is allowed for a certain task. There are two approaches to retry the service binding, namely alternative and repeat. The alternative approach indicates to attempt the service binding by assigning the task to different services in sequence, while the repeat method indicates to retry the service binding using the same services. The service binding is retried until either the service execution is successful or the number of retries reaches the specified upper bound. For example, in FIG. 4, a retry policy is associated with the task FutureExchange and StockExchange, which sets the upper bound of retry to be two. It should be noted that the retry policy is applied whenever the execution of a task timeout or fails.

Multiple Binding Policy. A multiple binding policy specifies the condition that allows the concurrent invocation of multiple services for a task execution. For example, in FIG. 5, a multiple bind policy is associated with the task SecuritySearching, which allows three concurrent service execution bindings. Therefore, three services can now be invoked at the same time to execute the task SecuritySearching, which completes when any of the services have completed their execution of the task.

Replacement Policy. A replacement policy specifies what other task can be used to replace a certain task in a business process when the execution of the task fails or has timeout and the number of retries had reach the upper bound as specified in the retry policy. For example, in FIG. 6, the replacement is associated with the task OnlineStockExchange, which indicates that when the number of retry has reached a given upper bound, the task OnlineStockExchange is to be replaced by the task ManualStockExchange.

Skip Policy. A skip policy specifies a condition when a business process needs to skip the execution of a certain task. For example, in FIG. 7, a skip policy is associated with the task LowPriceBid, which specifies that if the task execution has failed or timeout, then the execution LowPriceBid is to be skipped.

Rollback Policy. A rollback policy specifies the point at which execution of business process has to rollback when the execution of task has failed or timeout and the maximal allowed number of retries had been reached. For example, in FIG. 8, the rollback policy is associated with the tasks SecuritySearch and RiskAnalysis specifies that if the execution has failed or timeout and the maximal allowed number of retries had been reached, the business process execution is rollbacked to the task BudgetAnalysis. It should be noted that when a rollback policy is specified, for affected tasks (e.g., the task of BudgetAllocation), the services selected to execute the tasks are required to support the cancellation or compensation of a given operation within a certain time interval from its completion (see Boualem Benatallah et al., ibid.).

Exception Handling Policy Binding

In our framework, an exception handling policy is separated from any individual business processes. It regulates the behavior of business processes when execution exceptions are raised during runtime. Such an approach requires dynamically binding the exception handling policies with process schemas.

Figure 9:
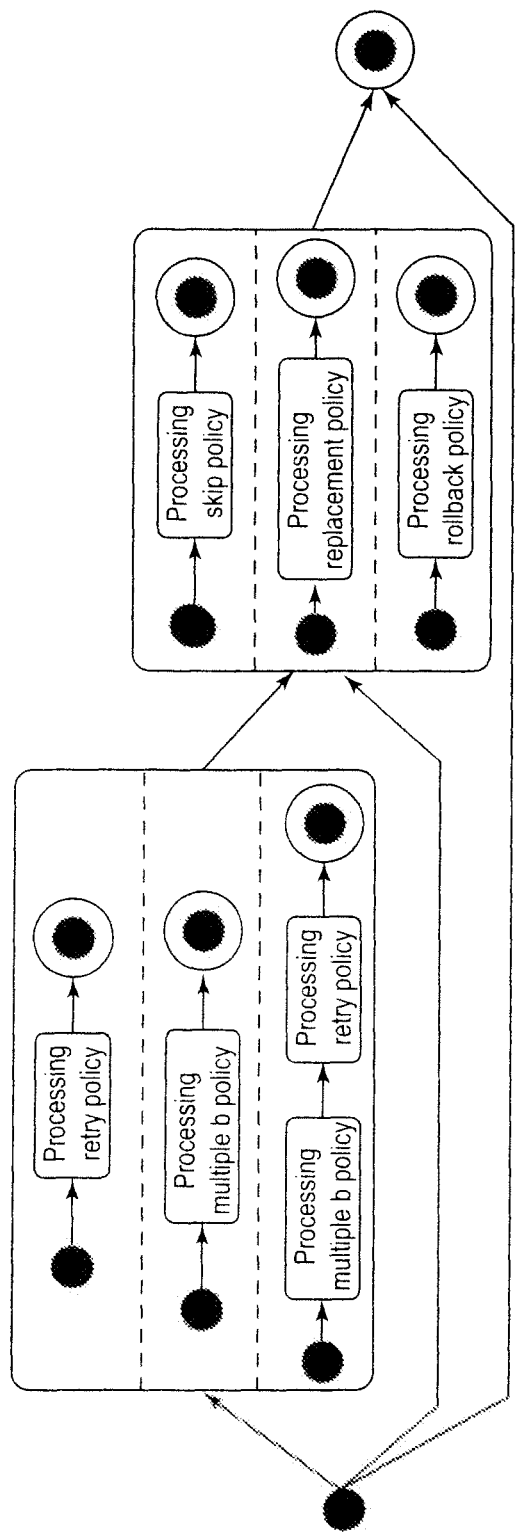
FIG. 9 is a block diagram of the procedure of processing exception handling policy.

In order to implement policy binding, the system identifies the exception handling policies that are associated with each task in a business process and then uses these policies to reconstruct the process schema. It should be noted that all types of policies except timeout policies can modify the structure of the process schema of a business process. FIG. 9 illustrates the procedure for applying policies to generate exception handling aware process schemas. In this procedure, we assume that: (i) A task is associated with only one instance of each type of policy. (ii) If a task is associated with both retry and multiple binding policies, then the action in the retry policy can only be retry (t, n, repeat).(iii) A task can only associate with either skip, replacement or rollback policy at a business process instance. The procedure starts with processing the multiple and retry policies, and then processes any skip, replacement or rollback policies.

In the remainder of this section, we present the algorithms for generating exception-aware process schemas. Here, we assume that the process schema is a 2-tuple <ST, TR>, where ST is the set of states and TR is the set of transitions between these states; a transition tr is a 3-tuple <initialState, targetState, r> and r is an Event Condition Action rule.

Figure 10:
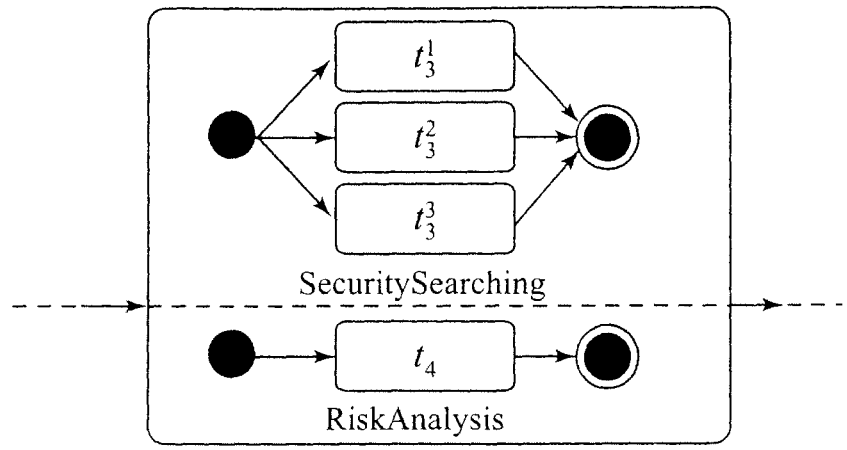
FIG. 10 is a block diagram of the processing result of a multiple binding policy.

Processing a multiple binding policy. The processing of a multiple binding policy for task $t_i$ is done by duplicating $t_i$ and enabling both $t_i$ and its duplicates at the same time (see Algorithm 1 below). For example, in the business process Security Investment, the task SecuritySearching is associated with a multiple binding policy. The processing result is shown in FIG. 10.

---
Algorithm1: processing a multiple binding policy
--- input : Task $t_i$, Process schema CS, Multiple Binding Policy p
begin
    N is multiple binding upper bound; $t_{i+1}$ is the next task of $t_i$, the transition between $t_i$ and $t_{i+1}$ is $tr_i$; $t_{i-1}$ is the previous task of $t_i$, the transition between $t_{i-1}$ and $t_i$ is $tr_{i-1}$
    for k ← 1 to N do
        $t_i^k$ ← clone($t_i^k$)
        if k == 1 then
            replace $t_i$ with $t_i^k$ in CS
        else
            ST ← ST ∪ {$t_i^k$}
            tr ← clone($tr_{i-1}$)
            $tr_{i-1}^k$ ← replace $t_i$ with $t_i^k$ in tr; TR ← TR ∪ {$tr_{i-1}^k$}
            tr ← clone($tr_i$)
            $tr_i^k$ ← replace $t_i$ with $t_i^k$ in tr; TR ← TR ∪ {$tr_i^k$}
end

---

Figure 11:
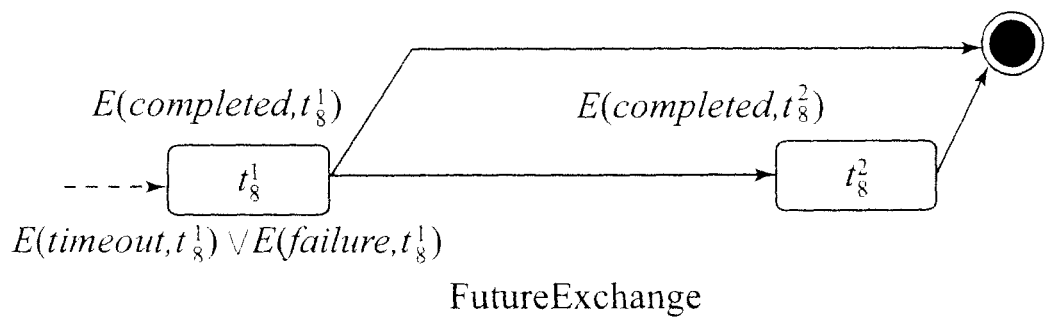
FIG. 11 is a block diagram of the processing result of a retry policy.

Processing a retry policy. The processing of a retry policy for task ki needs to consider two cases (see Algorithm 2 below): (i) Task $t_i$ is not associated with any multiple binding policy. This is a simple case which can be implemented by duplicating ti and enabling both $t_i$ and its duplicates in sequence. (ii) Task $t_i$ is also associated with a multiple binding policy. In this case, after processing the multiple binding policy, for each concurrent thread k the algorithm duplicates the task $t_i^j$ and enables both $t_i^j$ and its duplicates in sequence. For example, in the business process Security Investment, the task FutureExchange is associated with a retry policy but no multiple binding policies, which corresponds to case 1 of algorithm 2. The policy processing result is shown in FIG. 11.

---
Algorithm 2: Processing a retry policy
--- input : Task $t_i$, Process Schema CS, Retry Policy p
begin
    N is multiple binding upper bound; $t_{i+1}$ is the next task of $t_i$, the transition between $t_i$ and $t_{i+1}$ is tr
    if $t_i$ is not associated with any binding policies then
        for k ← 1 to N do
            $t_i^k$ ← clone($t_i$)
            if k == 1 then
                rename $t_i$ with $t_i^k$ in CS
                tr ←< $t_i^k$, $t_{i+1}$, E(completed, $t_i^k$)>
                TR ← TR ∪ {tr}
            else
                ST ← ST ∪ {$t_i^k$}
                tr ←< $t_i^{k-1}$, $t_i^k$, E(failure, $t_i$)∨E(timeout, $t_i$)>
                TR ← TR ∪ {tr}
                tr ←< $t_i^k$, $t_{i+1}$, E(completed, $t_i^k$)>
                TR ← TR ∪ {tr}
    else
        M ← multiple binding upper bound Algorithm 2: Processing a retry policy

```
        for j ← 1 to M do
            for k ← 1 to N do
                t_i^{j,k} ← clone(t_i^j)
                if k == 1 then
                    rename t_i with t_i^k in CS
                    tr ←< t_i^j, t_i^{j,k}, E(completed, t_i^j)>
                    TR ← TR ∪ {tr}
                else
                    ST ← ST ∪ {t_i^{j,k}}
                    tr ←< t_i^{j,k-1}, t_i^{j,k}, E(failure, t_i^{j,k-1})∨
                              E(timeout, t_i^{j,k-1})>
                    TR ← TR ∪ {tr}
                    tr ←< t_i^{j,k}, t_{i+1}, E(completed, t_i^{j,k})>
                    TR ← TR ∪ {tr}
        end
```

Figure 12:
FIG. 12 is a block diagram illustrating a compound state with a null state.

Processing a replacement policy. The processing of a replacement policy for task ti needs to consider four cases (see Algorithm 3 below):

(i) Task $t_i$ is associated with both a retry policy and a multiple binding policy. In this case, a compound state (see FIG. 12) is created to synchronize the concurrent threads when all of the tasks in all of concurrent threads fail. The compound state is also used to enable the alternative task.

(ii) Task $t_i$ is only associated with a retry and possibly other types of policies but not with any multiple binding policy. In this case, the alternative task is enabled when the last duplicated task fails.

(iii) Task $t_i$ is associated with a multiple binding policy and possibly other types of policies but not with any retry policy. In this case, the policy processing is similar to case 1.

Figure 13:
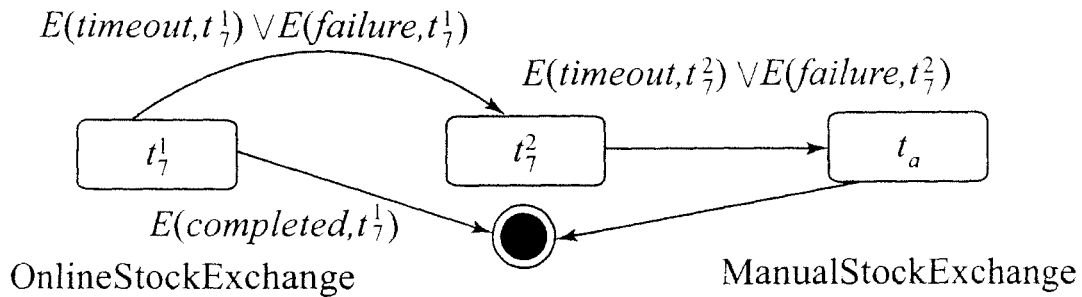
FIG. 13 is a block diagram of the processing result of a replacement policy.

(iv) Task $t_i$ is not associated with any retry or multiple binding policy. The alternative task is enabled when the execution of $t_i$ fails. For example, in the business process Security Investment, the task OnlineStockExchange is associated with a both replacement policy a retry policy, which corresponds to case 2 of algorithm 3. The processing result is shown in FIG. 13.

Algorithm 3: Processing a replacement policy

```
input : Task t_i, Process Schema CS, Replacement Policy p
begin
    t_a is the replacement task of t_i; ST ← ST ∪ {t_a}
    if t_i is associated with both Retry and Multiple Binding Policy then
        M ← multiple binding upper bound; N ← retry upper bound
        create a compound state st_co with a NULL state
        ST ← ST ∪ {st_co}
        tr is the transition between st_ini and st_null in st_co
        tr ←< st_ini, st_null, (E(failure, t_i^{1,N})∨ E(timeout, t_i^{1,N}))∧...∧
                  (E(failure, t_i^{M,N})∨ E(timeout, t_i^{M,N}))>
        for j ← 1 to M do
            tr ←< t_i^{j,N}, st_co, E(failure, t_i^{j,N})∨ E(timeout, t_i^{j,N})>
            TR ← TR ∪ {tr}
        tr ←< st_co, t_a >; TR ← TR ∪ {tr}
    if t_i is associated with Retry but not Multiple binding Policy then
        N ← retry upper bound
        tr ←< t_i^N, t_a, E(failure, t_i^N)∨ E(timeout, t_i^N)>
        TR ← TR ∪ {tr}
    if t_i is associated with Multiple Binding but not Retry Policy then
        M ← multiple binding upper limit
        create a compound state st_co with a NULL state
        ST ← ST ∪ {st_co}
        tr is the transition betwen st_ini and st_null in st_co
        tr ←< st_ini, st_null, (E(failure, t_i^1)∨ E(timeout, t_i^1))∧...∧
                  (E(failure, t_i^M)∨ E(timeout, t_i^M))>
        for j ← 1 to M do
            tr ←< t_i^j, st_co, E(failure, t_i^j)∨ E(timeout, t_i^j)>
```

Algorithm 3: Processing a replacement policy

```
            TR ← TR ∪ {tr}
        tr ←< st_co, t_a >; TR ← TR{tr}
    if t_i is not associated with either Retry or Multiple Binding
    Policy then
        tr ←< t_i, t_a, E(failure, t_i)∨ E(timeout, t_i)>
        TR ← TR ∪ {tr}
    tr ←< t_a, t_{i+1}, E(completed, t_a) >; TR ← TR ∪ {tr}
end
```

Processing a skip policy. The processing of a skip policy for task t also needs to consider four cases (see Algorithm 4 below):

(i) Task $t_i$ is associated with both a retry and a multiple binding policy. In this case, a compound state (see FIG. 12) is created to synchronize the concurrent threads when all of the tasks in all of concurrent threads fail. The compound state is also used to enable the next task so that ti can be skipped.

(ii) Task $t_i$ is only associated with a retry policy and possibly other types of policies but not with any multiple binding policy. In this case, the next task is enabled when the execution of $t_i$s last duplicate fails.

(iii) Task $t_i$ is associated with a multiple binding policy and possibly other types of policies but not with any retry policy. In this case, the policy processing is similar to case 1.

Figure 14:
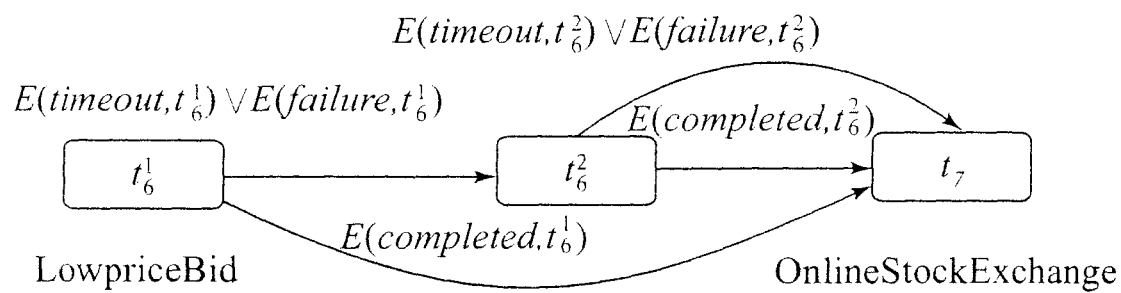
FIG. 14 is a block diagram of the processing result of a skip policy.

(iv) Task $t_i$ is not associated with any retry or multiple binding policy. The next task is enabled when the execution of $t_i$ fails. For example, in the business process Security Investment, the task LowPriceBid is associated with both a skip policy and a retry policy, which corresponds to case 2 of algorithm 4. The processing result is shown in FIG. 14.

Algorithm 4: Processing a skip policy

```
input : Task t_i, Process Schema CS, Skip Policy p
begin
    if t_i is associated with both Retry and Multiple Binding Policy then
        M ← multiple binding upper bound; N ← retry upper bound
        create a compound state st_co with a NULL state
        ST ← ST ∪ {st_co}
        tr is the transition between st_ini and st_null in st_co
        tr ←< st_ini, st_null, (E(failure, t_i^{1,N})∨ E(timeout, t_i^{1,N}))∧...∧
                  (E(failure, t_i^{M,N})∨ E(timeout, t_i^{M,N}))>
        for j ← 1 to M do
            tr ←< t_i^{j,N}, st_co, E(failure, t_i^{j,N})∨ E(timeout, t_i^{j,N})>
            TR ← TR ∪ {tr}
        tr ←< st_co, t_{i+1} >
        TR ← TR ∪ {tr}
    if t_i is associated with Retry Policy but not Multiple Binding Policy
    then
        N ← retry upper bound
        tr ←< t_i^N, t_{i+1}, E(failure, t_i^N)∨ E(timeout, t_i^N)>
        TR ← TR ∪ {tr}
    if t_i is associated with Multiple Binding Policy but not Retry Policy
    then
        M ← multiple binding upper bound
        create a compound state st_co
        ST ← ST ∪ {st_co}
        tr is the transition between st_ini and st_null
        tr ←< st_ini, st_null, (E(failure, t_i^1)∨ E(timeout, t_i^1))∧...∧
                  (E(failure, t_i^M)∨ E(timeout, t_i^M))>
        for j ← 1 to M do
            tr ←< st_ini, st_null, (E(failure, t_i^j)∨ E(timeout, t_i^j)>
            TR ← TR ∪ {tr}
        tr ←< st_co, t_{i+1}, >; TR ← TR ∪ {tr}
```

| Algorithm 4: Processing a skip policy |
|---|
| if $t_i$ is not associated with either Retry or Multiple Binding Policy then<br>    tr ←< $t_i$, $t_{i+1}$, E(failure, $t_i$) ∨ E(timeout), $t_i$)><br>    TR ← TR ∪ {tr}<br>end |

Processing a rollback policy. Processing of a rollback policy for task $t_i$ also needs to consider four cases (see Algorithm 5 below):

(i) Task $t_i$ is associated with both a retry and multiple binding policy. In this case, a compound state (see FIG. 12) is created to synchronize the concurrent threads when all the tasks in all concurrent threads fail. The compound state is also used to enable the rollback of the execution of the business process to the re-entry point.

(ii) Task $t_i$ is associated with a retry policy and possibly other types of policies but not with any multiple binding policy. In this scenario, the rollback is enabled when the execution of $t_i$'s last duplicated task fails.

(iii) Task $t_i$ is only associated with a multiple binding policy and possibly other types of policies but not with any retry policy. In this case, the policy processing is similar to case 1.

(iv) Task $t_i$ is not associated with any retry or multiple binding policy. The rollback is enabled when the execution of $t_i$ fails.

| Algorithm 5: Processing a rollback policy |
|---|
| input : Task ti, Process Schema CS, Rollback Policy p<br>begin<br>    the rollback entry point is $t_a$<br>    if $t_i$ is associated with both Retry and Multiple Binding Policy then<br>        M ← multiple binding upper bound; N ← retry upper bound<br>        create a compound state $st_{co}$ with a NULL state<br>        ST ←ST ∪ {$st_{co}$}<br>        tr is the transition between $st_{ini}$ and $st_{null}$ in $st_{co}$<br>        tr ←< $st_{ini}$, $st_{null}$, (E(failure, $t_i^{1,N}$) ∨ E(timeout, $t_i^{1,N}$)) ∧..∧<br>        (E(failure, $t_i^{M,N}$) ∨ E(timeout, $t_i^{M,N}$))><br>        for j ← 1 to M do<br>            tr ←< $t_i^{j,N}$, $st_{co}$, E(failure, $t_i^{1,N}$) ∨ E(timeout, $t_i^{1,N}$)><br>            TR ← TR ∪ {tr}<br>            for task $t_k$ between $t_a$ and $t_i$ (includes $t_a$) do<br>                if task $t_k$ needs to be compensated then<br>                    ST ← ST ∪ {undo($t_k$)}<br>                    tr ←< $st_{co}$, undo($t_k$)) >; TR ← TR ∪ {tr}<br>    if $t_i$ is associated with Retry but not Multiple Binding Policy then<br>        N ← retry upper bound<br>        for task $t_k$ between $t_a$ and $t_i$ (includes $t_a$) do<br>            if task $t_k$ needs to be compensated then<br>                ST ← ST ∪ {undo($t_k$)}<br>                tr ←< $t_i^N$, undo($t_k$)) >; TR ← TR ∪ {tr}<br>    if $t_i$ is associated with Multiple Binding but not Retry Policy then<br>        M ← multiple binding upper bound<br>        create a compound state $st_{co}$ with a NULL state<br>        ST ← ST ∪ {$st_{co}$}<br>        tr is the transition between $st_{ini}$ and $st_{null}$ in $st_{co}$<br>        tr ←< $st_{ini}$, $st_{null}$, (E(failure, $t_i^1$) ∨ E(timeout, $t_i^1$)) ∧..∧<br>        (E(failure, $t_i^1$) ∨ E(timeout, $t_i^M$)) ><br>        for j ← to M do<br>            tr ←< $t_i^j$, $st_{co}$, E(failure, $t_i^j$) ∨ E(timeout, $t_i^j$) ><br>            TR ← TR ∪ {tr}<br>            for task $t_k$ between $t_a$ and $t_i$ (includes $t_a$) do<br>                if task $t_k$ needs to be compensated then<br>                  ST ← ST ∪ {undo($t_k$)}<br>                  tr ←< $st_{co}$, undo($t_k$)) >; TR ← TR ∪ {tr}<br>    if $t_i$ is not associated with either Retry or Multiple Binding Policy then<br>        for task $t_k$ between $t_a$ and $t_i$ (includes $t_a$) do<br>            if task $t_k$ needs to be compensated then |

| Algorithm 5: Processing a rollback policy |
|---|
|                 ST ← ST ∪ (undo($t_k$)}<br>                tr ←< $t_i$, undo($t_k$), E(failure, $t_i$) ∨ E(timeout, $t_i$) >;<br>                TR ← TR ∪ {tr}<br>    tr ←< undo($t_a$), $t_a$ >; TR ← TR ∪ {tr}<br>end |

Figure 15:
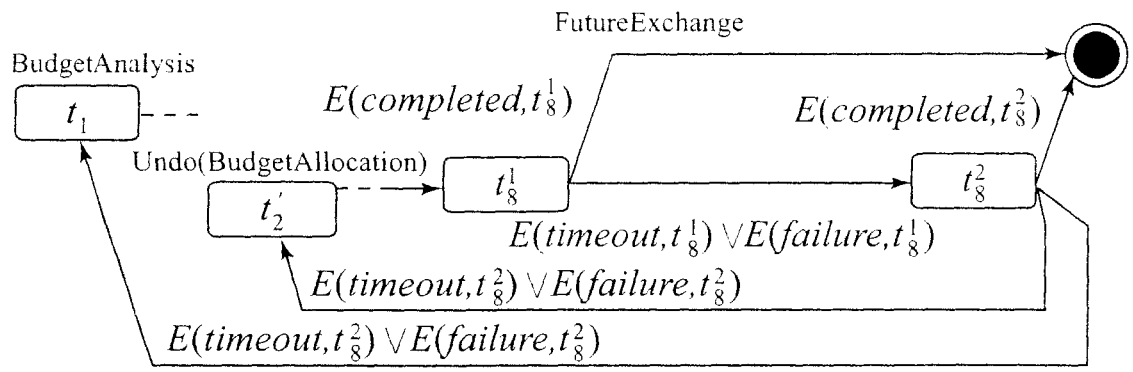
FIG. 15 is a block diagram of processing a rollback policy.

It should be noted that some completed tasks need to be undone if the compensation process is required. For example, in the business process Security Investment, the task FutureExchange is associated with both a rollback policy and a retry policy, which corresponds to case 2 of algorithm 5. The processing result is shown in FIG. 15.

Figure 16:
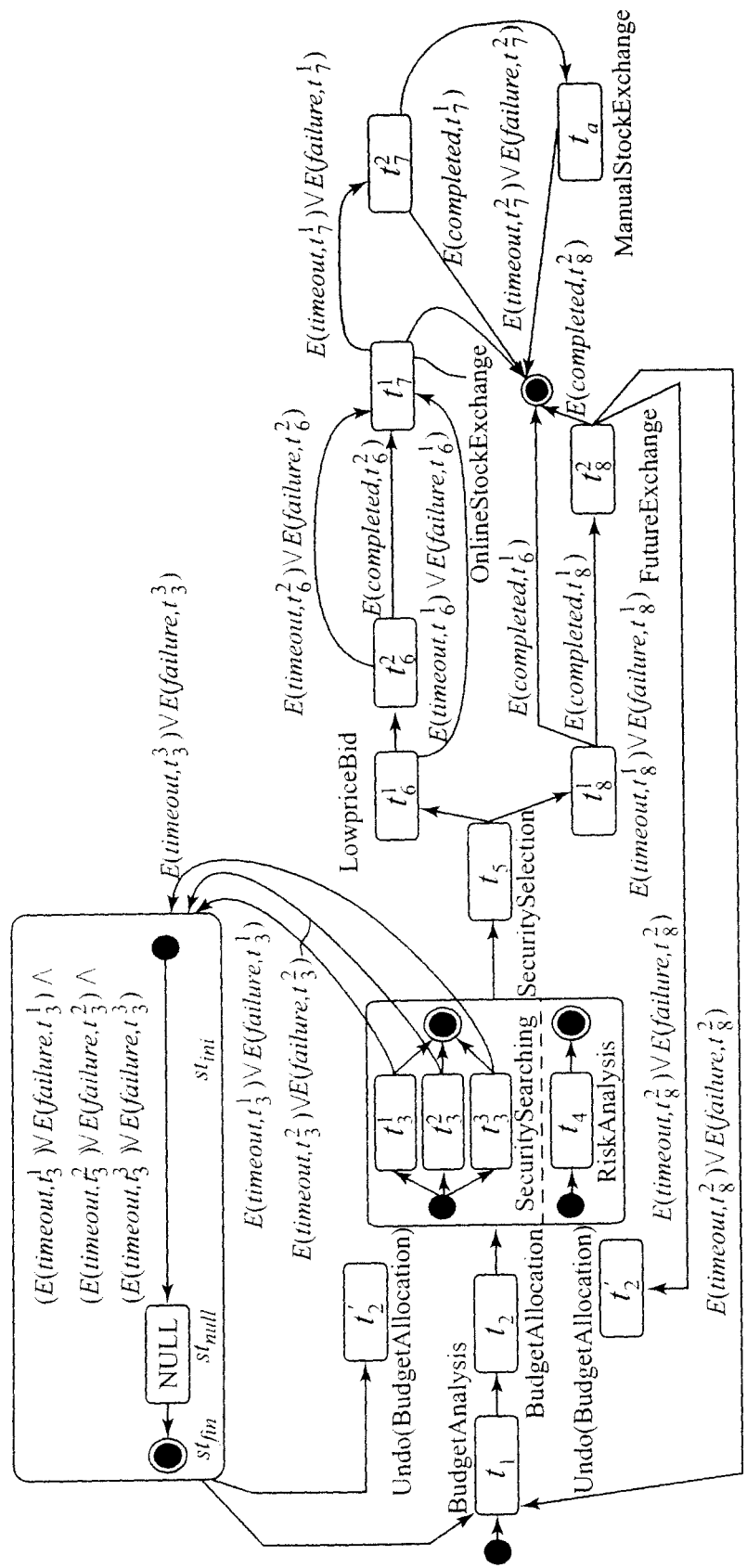
FIG. 16 is a statechart of the business process "security investment" after policy based reconstructing.

After the reconstruction of the process schema is completed, the extended process schema (see the example in FIG. 16 in which the processing result of the business process Security Investment is based on the exception handling policies given above) that contains exception management knowledge is used to conduct the execution planning. In our previous work (see Liangzhao Zeng et al., ibid.), we adopted Multiple Criteria Decision Making (see Valerie Belton and Theodor Stewart, *Multiple Criteria Decision Analysis: An Integrated Approach*, Kluwer Academic Publishers, 2002) techniques and used the integer programming (IP) approach to select an optimal execution plan for a business process. It should be noted that based on the extended process schema and the selected execution plan, a fully executable description of the business process can be generated. For example, a BPEL4WS script that contains exception handlers can be generated to execute the business process by a process execution engine.

Implementation

Figure 17:
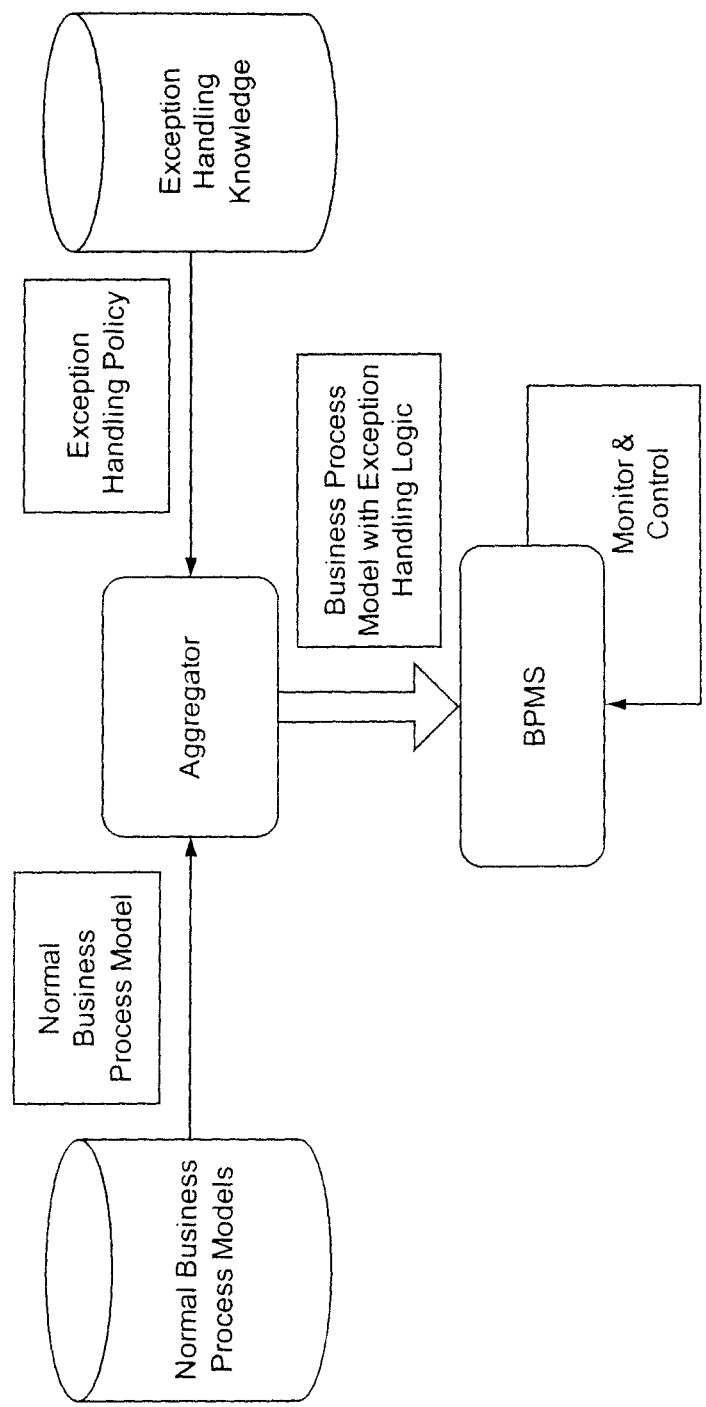
FIG. 17 is a block diagram of the architecture of the prototype of the invention.

The preferred implementation of the policy-driven exception-management framework for business processes is shown in FIG. 17. In the implementation, we use BPEL4WS as the language to describe process schemas. BPEL4 allows process modelers to create complex processes by creating and writing together different activities that can perform Web services invocations, manipulate data, throw fault, or terminate a process. In our implementation framework, we separate normal processes that are specified in BPEL4WS and the knowledge of exception management. There are two types of persistent storage, the Normal Business Process Schema Models and the Exception Handling Knowledge. The former stores normal process schemas that are defined by business analysts and the latter manages exception handling policies that are defined by exception handling experts.

The Aggregator exploits the schema re-construction algorithms described in previous sections and transforms such BPEL4WS-based process schema into an extended process schema that is also presented by BPEL4WS but contains more constructs reflecting the requirement of exception handling policies. The BPEL4WS script is deployed into the BPMS (Business Process Management System) that is essentially an execution engine for BPEL4WS. In our case, we are using IBM's DragonFly engine for this purpose. The system utilizes the orchestration and exception handling mechanism provided by the DragonFly engine to manage business processes.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for executing a business process and handling runtime exceptions, comprising steps, performed by a system infrastructure wherein the system infrastructure comprises a first persistent storage and a second persistent storage, of:
   storing, performed by a computer, in the first persistent storage, a process schema defined for the business process;
   storing, performed by the computer, in the second persistent storage, an exception handling policy defined for the business process;
   after accessing the first persistent storage and the second persistent storage, binding, performed by the computer at runtime of the business process on the computer, the process schema with the exception handling policy to generate an extended process schema definition for an extended process schema comprising a declaratively-defined exception policy for the business process;
   executing, performed by the computer at the runtime, the extended process schema definition;
   detecting, performed by the computer at the runtime, a runtime exception using the extended process schema definition, including:
      generating control tuples at a centralized location and deploying the control tuples to respective component Web services at local locations;
      detecting the runtime exception at one of the local locations using the deployed control tuples; and
   executing, performed by the computer, the declaratively-defined exception policy to perform an action changing the process schema upon the detecting the corresponding runtime exception.

2. The method of claim 1, further comprising checking compatibility between the exception handling policy and the process schema.

3. The method of claim 1, further comprising checking conflicts among the exception handling policy and other exception handling policies.

4. The method of claim 1, further comprising selecting between multiple modes of exception management in business processes.

5. The method of claim 4, wherein the computer operates in a distributed mode of exception management, the method further comprising binding exception policies with a specific execution plan at the runtime, and performing local exception detection and handling.

6. The method of claim 5, wherein the generation of the control tuples is performed by binding exception policies with a specific execution plan at the runtime.

7. The method of claim 1, wherein the exception handling policies are selected from the group consisting of a timeout policy; a retry policy; a multiple binding policy; a replacement policy; a skip policy and a rollback policy.

8. The method of claim 1, wherein a set of tokens for the exception handling policy comprises inst oblig, on, subject and do and the syntax is defined by:
   inst oblig policyName "{"
   on event-specification;
   subject domain-Scope-expression;
   do exception-management-action-list
   "{".

9. The method of claim 1, wherein the exception handling policy is a multiple binding policy and a processing of the multiple binding policy for a task t of the business process is performed by duplicating the task t to create task t' and enabling both the task t and the task t' at a same time.

10. The method of claim 1, wherein the exception handling policy is a retry policy and a processing of the retry policy for a task $t_i$ of the business process considers two cases: (i) the task $t_i$ is not associated with any multiple binding policy, and wherein the task $t_i$ is duplicated to create task and wherein the task $t_i$ and the task $t_i'$ are enabled in sequence; and (ii) the task $t_i$ is associated with a multiple binding policy, and wherein, after processing the multiple binding policy, for each concurrent thread k, a task $t_i^j$ is duplicated to create task $t_i^{j'}$ and wherein the task $t_i^j$ and the task $t_i^{j'}$ are enabled in sequence.

11. The method of claim 1, wherein the exception handling policy is a replacement policy and a processing of the replacement policy for a task $t_i$ of the business process considers four cases: (i) the task $t_i$ is associated with both a retry policy and a multiple binding policy, and wherein a compound state is created to synchronize concurrent threads when all tasks in all of the concurrent threads fail and the compound state is also used to enable an alternative task; (ii) the task $t_i$ is associated with the retry policy and not with any multiple binding policy, and wherein the alternative task is enabled when a last duplicated task fails; (iii) the task $t_i$ is associated with the multiple binding policy and not with any retry policy, and wherein the policy processing is similar to case (i); and (iv) the task $t_i$ is not associated with the retry policy or the multiple binding policy, and wherein the alternative task is enabled when execution of the task $t_i$ fails.

12. The method of claim 1, wherein the exception handling policy is a skip policy and a processing of the skip policy for a task $t_i$ of the business process considers four cases: (i) the task $t_i$ is associated with both a retry policy and a multiple binding policy, and wherein a compound state is created to synchronize concurrent threads when all tasks in all of the concurrent threads fail and the compound state is also used to enable a next task so that the task $t_i$ can be skipped; (ii) the task $t_i$ is only associated with the retry policy and not with any multiple binding policy, and wherein the next task is enabled when execution of a last duplicate of the task $t_i$ fails; (iii) the task $t_i$ is associated with the multiple binding policy and not with the retry policy, and wherein the policy processing is similar to case (i); and (iv) the task $t_i$ is not associated with the retry policy or the multiple binding policy, and wherein the next task is enabled when the execution of the task $t_i$ fails.

13. The method of claim 1, wherein the exception handling policy is a rollback policy and a processing of the rollback policy for a task $t_i$ of the business process considers four cases: (i) the task $t_i$ is associated with both a retry policy and a multiple binding policy, and wherein a compound state is created to synchronize concurrent threads when all tasks in all concurrent threads fail and the compound state is also used to enable rollback of execution of the business process to a re-entry point; (ii) the task $t_i$ is associated with the retry policy and not with the multiple binding policy, and wherein the rollback policy is enabled when execution of a last duplicate of the task $t_i$ fails; and (iii) the task $t_i$ is only associated with the multiple binding policy and not with the retry policy, and wherein the policy processing is similar to case (i); and (iv) the task $t_i$ is not associated with the retry policy or the multiple binding policy, and wherein the rollback policy is enabled when execution of the task $t_i$ fails.

14. A method for executing a composite Web service comprising a plurality of component Web services and handling runtime exceptions, the method comprising:

storing in a first persistent storage at a centralized location a process schema defined for the composite web service at development time;

supplying runtime exception handling knowledge by individual component Web services, the runtime exception handling knowledge being stored in other persistent storages at locations local to the respective individual component Web services, the local locations being remote from the centralized location;

with a service composition middleware, after accessing said first persistent storage and said other persistent storages, binding, at runtime, the composite web service and an exception handling policy to generate an extended process schema definition for an extended process schema comprising a declaratively-defined exception policy for the composite web service;

executing the extended process schema definition that contains the exception handling knowledge containing the declaratively-defined exception policy;

detecting the runtime exceptions with both centralized exception management and distributed exception management, including:
- detecting and handling some runtime exceptions at the centralized location with the extended process schema definition that was generated with the service composition middleware;
- generating control tuples at the centralized location and deploying the control tuples to respective ones of the component Web services at the local locations;
- detecting the runtime exceptions at the local locations using the deployed control tuples; and
- performing local exception handling actions defined in the declaratively-defined exception policy.

15. The method of claim 14, wherein the plurality of component Web services consists of a mixture of elementary Web services and other composite Web services.

16. The method of claim 14, wherein the exception handling policy has a syntax comprising a set of tokens, wherein each of the tokens specifies an exception handling action.

17. The method of claim 14, further comprising:
checking compatibility between the exception handling policy and the composite web service;
checking conflicts among the exception handling policy and other exception handling policies; and
selecting between multiple modes of exception management in business processes.

18. A system for executing a business process and handling runtime exceptions, comprising:
a computer comprising:
a first persistent storage in which is stored a process schema defined for the business process at development time;
a second persistent storage in which is stored an exception handling policy defined for the business process;
an aggregator which accesses the first persistent storage and the second persistent storage when the runtime exceptions are detected, wherein the aggregator performs binding, at runtime of the business process, the exception handling policy to generate an extended process schema definition for an extended process schema comprising a declaratively-defined exception policy for the business process; and
a business process engine into which is received the extended process schema definition from the aggregator at run time and in which is executed subroutines which include the extended process schema definition that contains runtime exception handling knowledge, a detection of the runtime exceptions, including generating control tuples at a centralized location and deploying the control tuples to respective component Web services at local locations and detecting the runtime exception at one of the local locations using the deployed control tuples, and subroutines which include exception handling actions defined in the exception handling policy.

19. The system of claim 18, wherein the exception handling policies are selected from the group consisting of a timeout policy; a retry policy; a multiple binding policy; a replacement policy; a skip policy and a rollback policy.

* * * * *